US008873742B1

(12) United States Patent
Owens et al.

(10) Patent No.: US 8,873,742 B1
(45) Date of Patent: Oct. 28, 2014

(54) ECHO CANCELLER AUDITOR

(75) Inventors: Brad Owens, Stilwell, KS (US); Dahl Metters, Shawnee Mission, KS (US); Perry Watson, Overland Park, KS (US)

(73) Assignee: Sprint Communications Company L.P., Overlnad Park, KS (US)

( * ) Notice: Subject to any disclaimer, the term of this patent is extended or adjusted under 35 U.S.C. 154(b) by 1881 days.

(21) Appl. No.: 11/375,179

(22) Filed: Mar. 15, 2006

(51) Int. Cl.
*H04M 9/08* (2006.01)

(52) U.S. Cl.
USPC .................................. 379/406.08

(58) Field of Classification Search
USPC ................ 379/1.01–35, 406.01–406.16
See application file for complete search history.

(56) References Cited

U.S. PATENT DOCUMENTS

| 5,970,154 | A | * | 10/1999 | Chen et al. ...................... 381/66 |
| 6,064,873 | A | * | 5/2000 | Eriksson et al. ............... 455/403 |
| 6,502,132 | B1 | * | 12/2002 | Kumano et al. ................ 709/224 |
| 2003/0065830 | A1 | * | 4/2003 | Tung et al. ......................... 710/8 |
| 2004/0114752 | A1 | * | 6/2004 | Rude et al. ................ 379/406.01 |
| 2004/0125944 | A1 | * | 7/2004 | Popovic et al. ........... 379/406.01 |
| 2004/0240664 | A1 | * | 12/2004 | Freed ........................ 379/406.01 |
| 2006/0221876 | A1 | * | 10/2006 | Kosanovic et al. ............ 370/286 |
| 2009/0067353 | A1 | * | 3/2009 | Hunt et al. ..................... 370/286 |

* cited by examiner

*Primary Examiner* — Sonia Gay

(57) ABSTRACT

Systems and methods are discussed for providing a solution for managing a number of echo cancellers and maintaining their configuration. A software tool is provided to verify and remove incorrect configurations that may result in echo in voice conversations. The configurations are updated using a pre-defined configuration, another echo canceller, or a template. Old configurations for the echo cancellers are stored and may be re-loaded (as a pre-defined configuration) if a problem is encountered with the updated configurations.

22 Claims, 11 Drawing Sheets

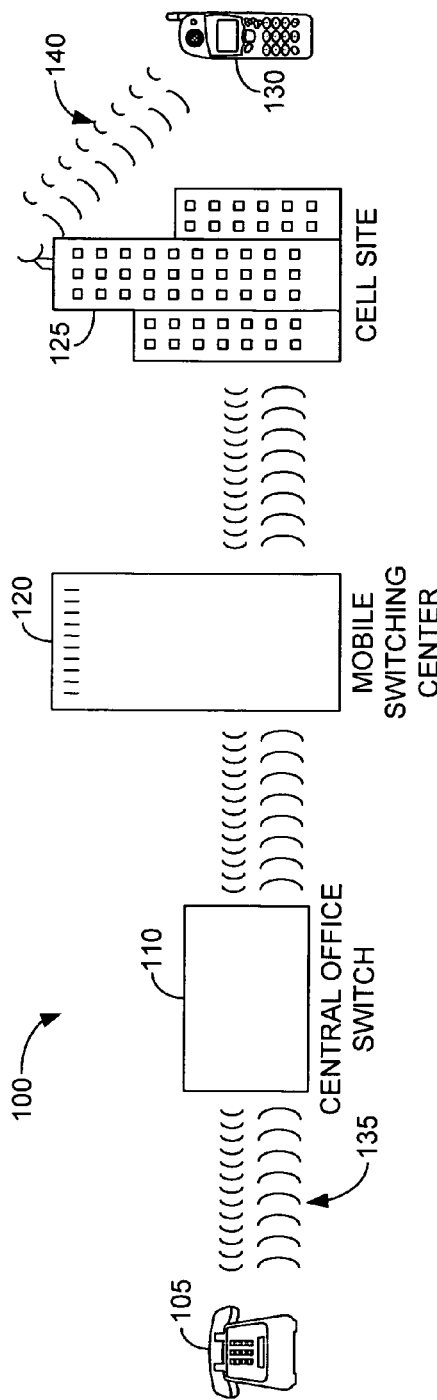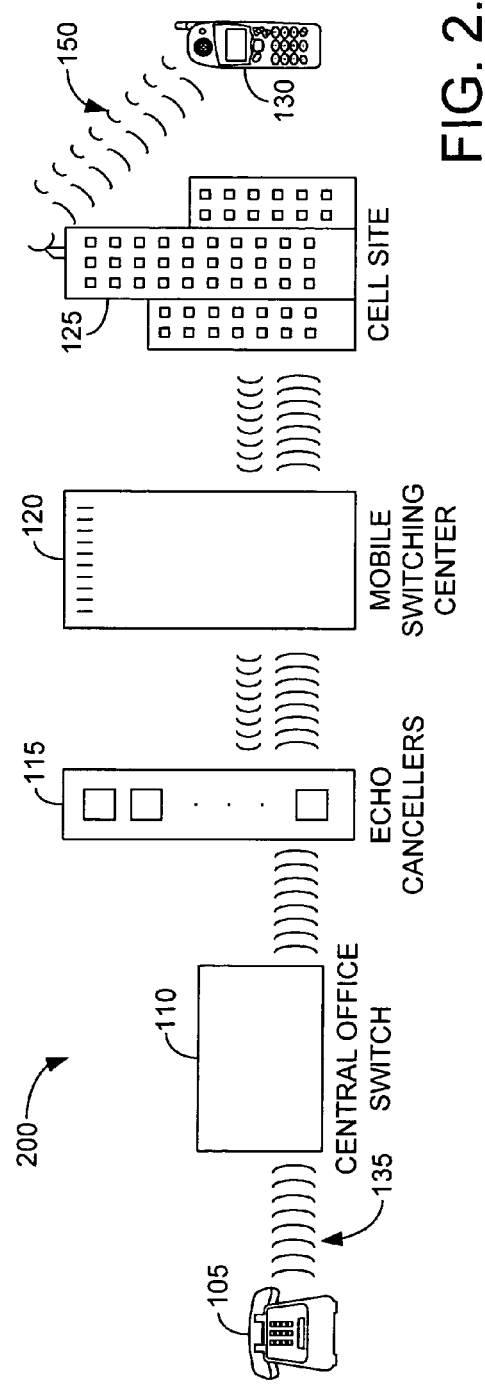

Connecting to ahm-tec-4503-1 Connected to ahm-tec-4503-1

| Field | ahm-tec-4503-1 | IMT |
|---|---|---|
| AIS Alarm Send | Warning | Warning |
| AIS Alarm Receive | Warning | Warning |
| LOF Alarm Send | Major | Warning |
| LOF Alarm Receive | Major | Warning |
| LOS Alarm Send | Major | Warning |
| LOS Alarm Receive | Major | Warning |
| Yellow Alarm Send | Major | Warning |
| Yellow Alarm Receive | Major | Warning |
| Digroup Configuration | | |
| Metallic Bypass on Failure | enable | enable |
| Internal Bypass | disable | disable |
| Out of Service | disable | disable |
| Loopback Receive In To Send Out | disable | disable |
| Loopback Send In to Receive Out | disable | disable |
| AIS Alarm on Loss of Frame | enable | enable |
| Tandem Mode | disable | disable |
| ITU-T NLP Compatibility | disable | enable |
| Idle Code Detect | disable | disable |
| Signaling Tone Disabler | None | C5/C7 Tone Disabler |
| Tone disabler Type | G.164 Tone Disabler | G.165 Tone Disabler |
| Signal Detect | Disable on Send | Disable on Send |
| Minimum ERL | 0 db | 6 db |

FIG. 5A.

| DigroupOptionConfiguration | | |
|---|---|---|
| TLC SND | disable | disable |
| TLC Maximum Step Size SND | 3db | 3db |
| Target Audio Level SND | -9 db | -9 db |
| Endpath Delay SND | 64 ms | 64 ms |
| Endpath Delay RCV | 0 ms | 0 ms |
| TLC Receive | disable | disable |
| TLC Maximum Step Size RCV | 3db | 3db |
| Target Audio Level RCV | -9 db | -9 db |
| Release Mode | Hold Band for EC and VQE features | Hold Band for EC and VQE features |
| Framing Format | SF | SF |
| Line Coding | AMI | B7ZCS |
| Frame Error Protection | 2 errors in 5 Fr bits | 4 errors in 12 Fr bits |
| Robbed Bit Signaling | disable | enable |
| Line Length - SND | 0 - 133 ft | 0 - 133 ft |
| Line Length - RCV | 0 - 133 ft | 0 - 133 ft |
| Chan 0: Cancellation | disable | enable |
| Chan 0: H-Register | clear | No_Action |
| Chan 0: Convergence | enable | enable |
| Chan 0: NLP | disable | enable |
| Chan 0: Forced Cancelation | Normal Operation | Normal Operation |
| Chan 0: TLC | disable | disable |

FIG. 5B.

| | | |
|---|---|---|
| Chan 1: H-Register | clear | No Action |
| Chan 1: Convergence | enable | enable |
| Chan 1: NLP | disable | enable |
| Chan 1: Forced Cancelation | Normal Operation | Normal Operation |
| Chan 1: TLC | disable | disable |
| Chan 1: Sig. Bits | ERROR | E&M |
| Chan 2: Cancellation | disable | enable |
| Chan 2: H-Register | clear | No Action |
| Chan 2: Convergence | enable | enable |
| Chan 2: NLP | disable | enable |
| Chan 2: Forced Cancelation | Normal Operation | Normal Operation |
| Chan 2: TLC | disable | disable |
| Chan 2: Sig. Bits | ERROR | E&M |
| Chan 3: Cancellation | disable | enable |
| Chan 3: H-Register | clear | No Action |
| Chan 3: Convergence | enable | enable |
| Chan 3: NLP | disable | enable |
| Chan 3: Forced Cancelation | Normal Operation | Normal Operation |
| Chan 3: TLC | disable | disable |
| Chan 3: Sig. Bits | ERROR | E&M |
| Chan 4: Cancellation | disable | enable |
| Chan 4: H-Register | clear | No Action |
| Chan 4: Convergence | enable | enable |
| Chan 4: NLP | disable | enable |

FIG. 5C.

```
AIS Alarm on Loss of Frame:         enable
Tandem Mode:                        disable
ITU-T NLP Compatibility:            disable
Channel Idle Code Pattern:
Idle Code Detect:                   disable
Signaling Tone Disabler:            None
C5 or C6/C7 Disabler:
Tone disabler Type:                 G.164 Tone Disabler
Signal Detect:                      Disable on Send
Release Mode:                       Hold Band for EC and VQE features
Netreach
Netreach Path Delay
EC T1 Config
Framing Format:                     SF
Line Coding:                        AMI
Frame Error Protection:             2 errors in 5 Fr bits
Robbed Bit Signaling:               disable
Busy/Idle Detection Mode:
Line Length - SND:                  0 - 133 ft
Line Length - RCV:                  0 - 133 ft
GM OnStar:
EC Options Config:
TLC:                                disable/disable
TLC Maximum Step Size:              3db/3db
Target Audio Level:                 -9 db/-9 db
Dynamic Signal Transfer:            disable
Minimum ERL:                        0 db
Endpath Delay:                      64 ms/0 ms
EC Alarm Config:
AIS Alarm:                          Warning/Warning
LOF Alarm:                          Major/Major
LOS Alarm:                          Major/Major
Yellow Alarm:                       Major/Major
Channel Configuration:
Channel Config (SND):
```

| Chan | Cancellation | H-Register | Convergence | NLP | Self Test | Forced Cancelation | TLC | Sig. Bits |
|------|--------------|------------|-------------|---------|-----------|--------------------|---------|-----------|
| 01   | disable      | clear      | enable      | disable | ??????    | Normal Operation   | disable | ERROR     |
| 02   | disable      | clear      | enable      | disable | ??????    | Normal Operation   | disable | ERROR     |

FIG. 6B.

High Level Algorithm.

Analyze switch to set initial flags                                     700
Initialize Echo Canceller data structure
Load any Mask file
Load any configuration file or retrieve configuration for database
Load Echo Canceller Configuration Data
Load any template file
If in verify mode perform configuration verification on template
If in update mode update the configuration of the Echo Canceller to the database
If in configuration mode then load the configuration or template file to the echo canceller
If in back out mode then perform back out procedure.
If Report Mode then Generate Report Loading the Echo Canceller Data
    Connect to the echo canceller on configured port (default 23)
    For each configuration type
        Perform Data Request for configuration type
        Process Response Message for configuration type Performing Data Request for Task
    Make Task Request String
    Write Task String to device
    Process Response Message Process Response Message
    Read Message
    Verify Message is Valid
    Parse message into message components based upon component type
    Store Message in corresponding response type based on message type.

Performing configuration verification of single Canceller to template
    Create Message Element List String for each configuration type
    Apply mask for each message element string
    Compare message element string to template item for each element string

FIG. 7A.

Loading Config File
  Open File
  Read File Element List Strings for each message type
  Apply mask to each message element string Back out procedure
  Load previous configuration data from database
  Write data out to the device Write Template
  Set Send Line Length
  Set Receive Line Length
  Set Send Receive Database mask
  For each configuration item
    Perform Data Request for configuration item to set value
    Process Response Message.

Do Update
  For each echo Canceller requiring an update
    Create Message Element List String for each message type
    Store Message Element string in database Generate Report
  For each Canceller a report is requested
    Convert all bit data into field data
    For each configuration item
      Output each item.

Verify Configurations
  For each configuration in Canceller
    Apply mask
    Compare configuration item
    Report differences

FIG. 7B.

ECHO CANCELLER AUDITOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Echo cancellers are essential components to a telecommunications network. Echo cancellers enable voice communications to be clearer especially with talking paths existing over very long distances. Usually, echo cancellers are located with or near switching equipment and are connected to circuits that interface to the switching equipment. Literally, thousands of echo cancellers may exist with connections to the switching equipment.

A problem with echo cancellers is that they can be difficult to maintain depending on the size of the switching equipment. Each echo canceller has to be configured correctly to reduce or rid the "talking path" of echo during a voice conversation. As an aside, there are usually three sources of echo: hybrid or network echo, handset acoustic coupling, and ambient acoustic echo. Unfortunately, it is possible to mis-configure or change the configuration of the echo canceller thereby causing echo to be heard during a voice conversation.

An echo canceller's configuration may be set when it is initially installed. Echo cancellers have several parameters that may be adjusted based on the operating environment. In many circumstances, large numbers of echo cancellers may have parameters set to the same values. This is possible for a number of reason such as the trunk circuits between the switching offices have the same signaling type; the distances between switching offices are within a certain range; or the timing values over the trunk circuits are similar. Other parameters affect the configuration of echo cancellers and may be set to the same values also. However, the alternative is true as well. Some echo cancellers have distinct requirements which may require that they have special values set for their parameters. These special values are due to the unique operating conditions for the particular echo canceller. If the distinct parameters are small in number, a service provider may separately maintain these sets of echo cancellers and maintain their parameters in an identifiable file or database.

When an echo is heard in a voice communication, it may be deemed an echo canceller failure. Echo cancellers may fail for a number of reasons including a device failure, a lack of echo canceller for the circuit, or echo canceller options set incorrectly. As mentioned above, incorrect options may be due to mis-configuring the echo canceller during installation or later changing the configuration of the echo canceller.

With a large number of echo cancellers, the job can be very tedious in keeping echo cancellers configured properly. The work involves manually evaluating each echo canceller to insure proper operation. A worker has to access the configuration data of the echo canceller and make a comparison of the parameters to a standard set of parameters from either a pre-defined configuration, a model echo canceller, or a template. With thousands of echo cancellers operating at one switching office, the maintenance work can be laborious and long.

It would be beneficial to have a solution that could automatically verify the configurations of numerous echo cancellers, update the configurations of those echo cancellers that have been configured improperly or are causing problems, and report the status of the echo cancellers. This solution could improve customer satisfaction by reducing the delay in finding and resolving problems with echo cancellers. It may also reduce costs in the manual efforts to find and resolve problems associated with the echo cancellers.

SUMMARY

The present invention is defined by the claims below. Embodiments of the present invention solve at least the above problems by providing a system and method for, among other things, managing a number of echo cancellers. The present invention has several practical applications in the technical arts including verifying configuration information in an echo canceller and setting a configuration of the echo canceller.

In a first aspect, a computer system having a processor and a memory for executing a method for verifying configuration information in an echo canceller is provided that includes retrieving information from echo cancellers. The information is selected from a group including parameters. The information is compared to a pre-defined configuration, another echo canceller, or a template. Mismatches between the information and either the pre-defined configuration, the another echo canceller, or the template are reported.

In another aspect, a computer system having a processor and a memory for executing a method for setting a configuration of an echo canceller is provided that includes retrieving information from echo cancellers. The information is selected from a group including parameters. The information is compared to a pre-defined configuration, another echo canceller, or a template. The echo cancellers are updated when the information mismatches to the pre-defined configuration, the another echo canceller, or the template. The echo cancellers are loaded with the pre-defined configuration, the another echo canceller, or the template.

In yet another aspect, a system for managing a number of echo cancellers is provided that includes echo cancellers operating in a first network. The echo cancellers operate to communicate with computing devices through the first network or a second network. The computing devices operate with a tool to exchange data between the tool and the computing devices. The tool operates to retrieve information from the echo cancellers, and to compare the information to a pre-defined configuration, another echo canceller, or a template.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 1 is a block diagram of an exemplary telecommunications network operating without echo cancellers;

FIG. 2 is a block diagram of an exemplary telecommunications network operating with echo cancellers;

FIGS. 5A, 5B, and 5C are an exemplary comparison of an echo canceller to a template when operating an embodiment of the present invention;

FIGS. 6A and 6B are an exemplary echo canceller report created when operating an embodiment of the present invention; and FIGS. 7A and 7B are an exemplary listing of algorithms suitable for practicing an embodiment of the present invention.

DETAILED DESCRIPTION

Figure 3:
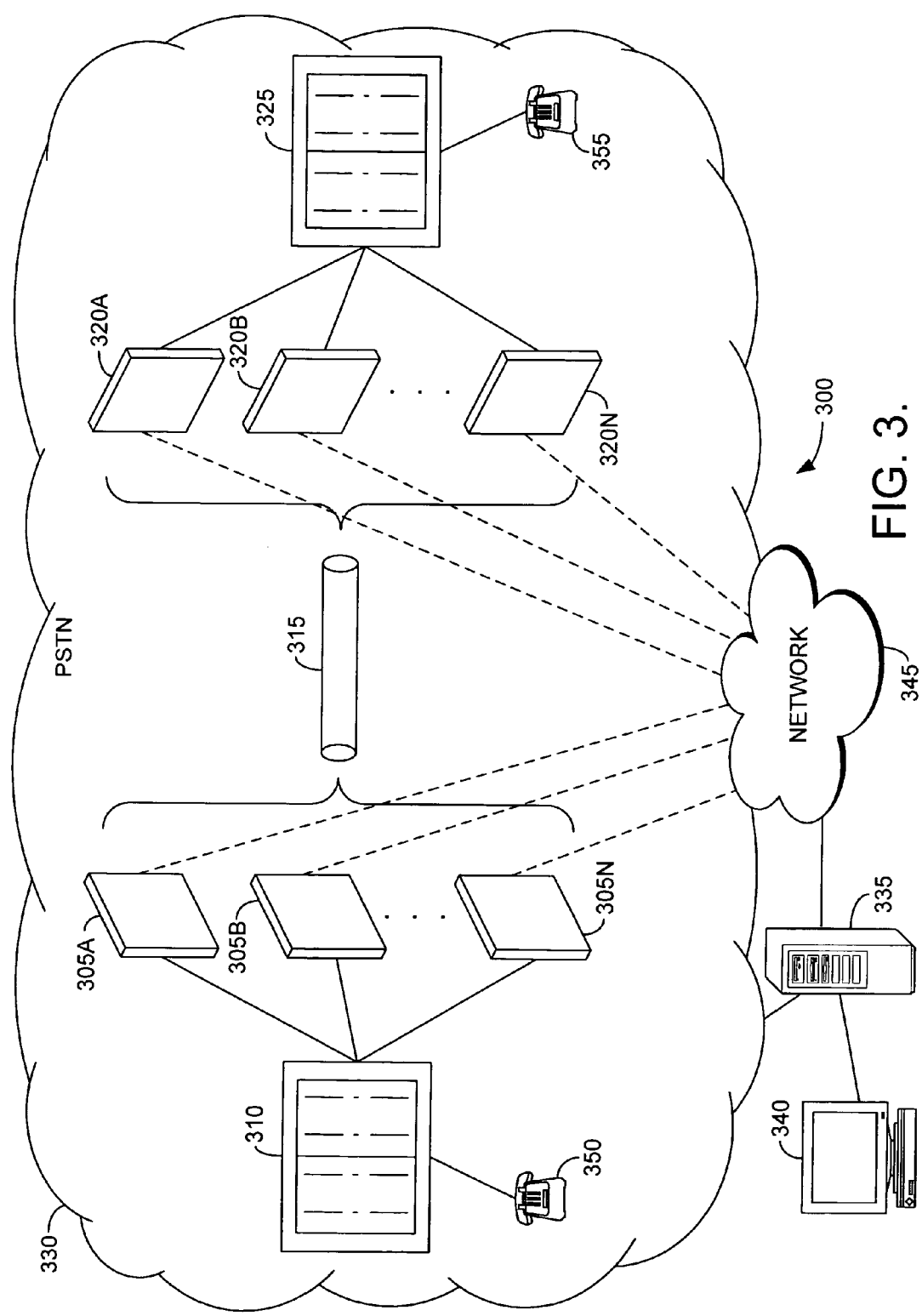
FIG. 3 is a block diagram an exemplary operating environment implemented when practicing an embodiment of the present invention.

Embodiments of the present invention provide systems and methods for managing a number of echo cancellers, verifying configuration information in an echo canceller, and setting a configuration of the echo canceller.

ACRONYMS AND SHORTHAND NOTATIONS

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

PSTN Public Switched Telephone Network

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Echo Canceller Auditor

An embodiment of the present invention provides a software tool to allow a service provider to audit, correct, and store configuration information for echo cancellers. The tool may retrieve information from the echo cancellers, compare the information to either a pre-defined configuration, another echo canceller, or a template, and take appropriate actions based on the findings. If the findings result in a mismatch during the comparison, the tool may update the configuration of the echo canceller. If the findings result in a match, the tool may take no action. In either case, an embodiment of the present invention allows reports to be generated based on the tools' actions. To further clarify, a pre-defined configuration may be a set of configuration parameters that are previously defined for a specific echo canceller. This may correspond to a previously-stored configuration or a last known correct configuration. A model echo canceller may be used (as a clone) to provide a set of configurations to the echo canceller. A template may be a set of specifically-created configuration parameters that are tailored for the echo canceller. Several figures shall now be discussed to provide more details about implementing an embodiment of the present invention.

In FIG. 1, a block diagram of an exemplary telecommunications network operating without echo cancellers is shown in 100. Network 100 includes a telephone 105, a central office switch 110, a mobile switching center 120, a cell site 125, a mobile phone 130, a talking signal 135, and an echo signal 140.

Network 100 is an exemplary scenario of a talking path and devices that may be used in establishing a voice conversation. As shown, an exemplary voice conversation exists between telephone 105 and mobile phone 130 shown by talking signal 135. However, mobile device 130 generates an acoustical echo causing a reflected signal to be sent through the talking path as echo signal 140. The result is telephone 105 hears echo during the voice conversation.

FIG. 1 is illustrative of one type of echo that may occur in a telecommunications network. Other types of echo may occur that are not shown including network echo generated from an impedance imbalance between network elements. Echo may vary for each voice conversation but tends to involve transmission path characteristics such as round-trip delay. As the round-trip delay increases, the echo becomes more pronounced.

To rectify the situation of echo, a telecommunications network may have a number of echo cancellers as shown by echo cancellers 115 in FIG. 2. Network 200 is an illustration of network 100 with echo cancellers 115 inserted between central office switch 110 and mobile switching center 120. As shown in FIG. 2, echo cancellers 115 operate to reduce or remove echo so that telephone 105 does not experience the echo. Echo signal 150 represents the echo emanating from mobile phone 130. But as is shown, echo signal 150 ceases to propagate beyond echo cancellers 115.

Echo cancellers 115 operate correctly when properly configured. Configuration of each echo canceller may involve accessing the database of the echo canceller to set or initialize a number of parameters based on the operating environment of echo cancellers 115. For example, two sets of echo cancellers may have different parameter values if the two sets are connected to trunk circuits with different signaling protocols, if the two sets are connected to different far-end switching offices, and if the two sets traverse different paths such as satellite versus terrestrial versus microwave. With a switching office having a large number of echo cancellers, it is possible to have numerous echo cancellers with the same configuration. For example, a switching office with 50,000 circuits may have 2,084 echo cancellers in a 24-channel environment. In a 30-channel environment, this number may be 1,667 echo cancellers.

Figure 4:
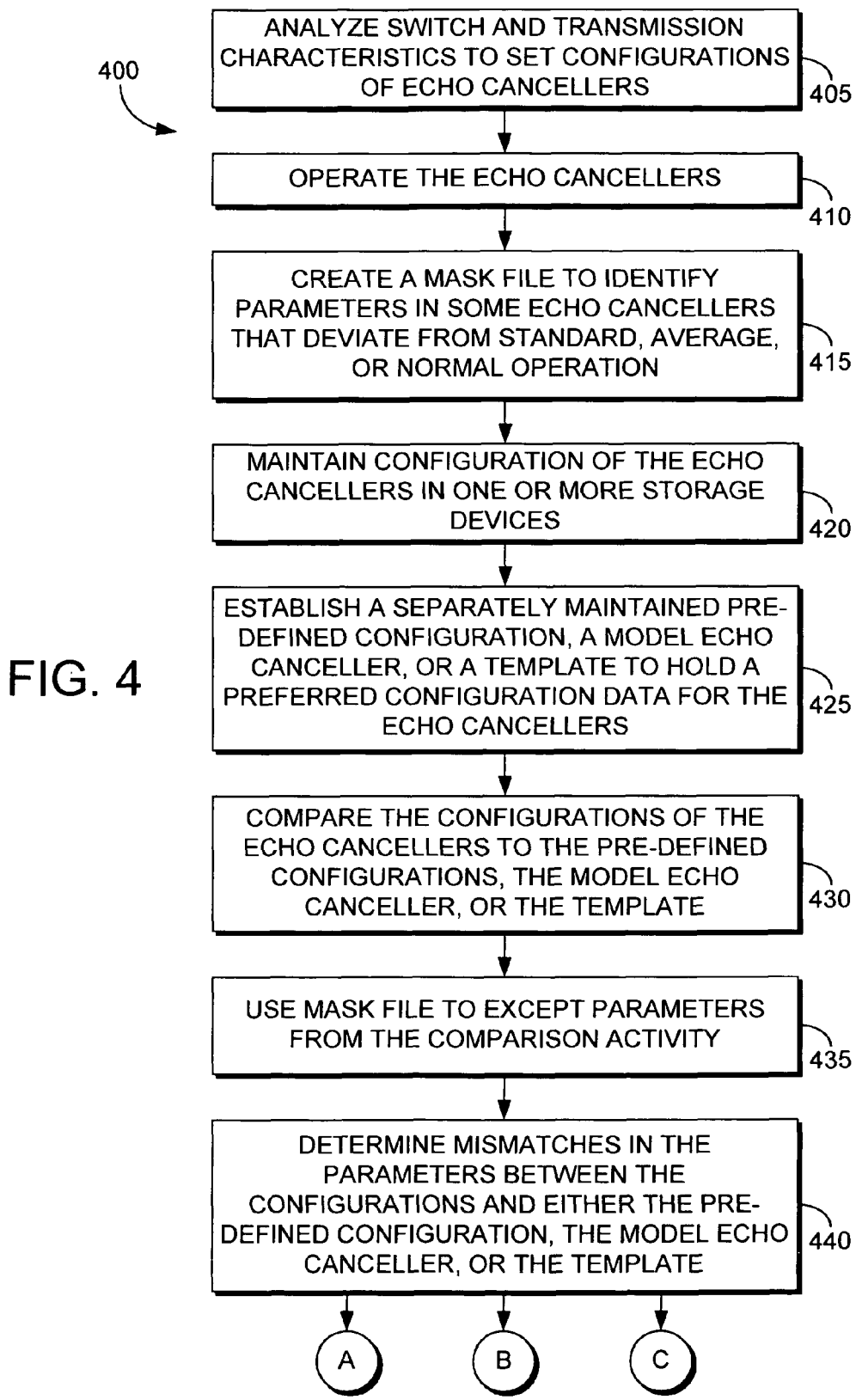
FIG. 4 is a flowchart of an exemplary process for automatically configuring a number of echo cancellers when implementing an embodiment of the present invention.
Figure 4:
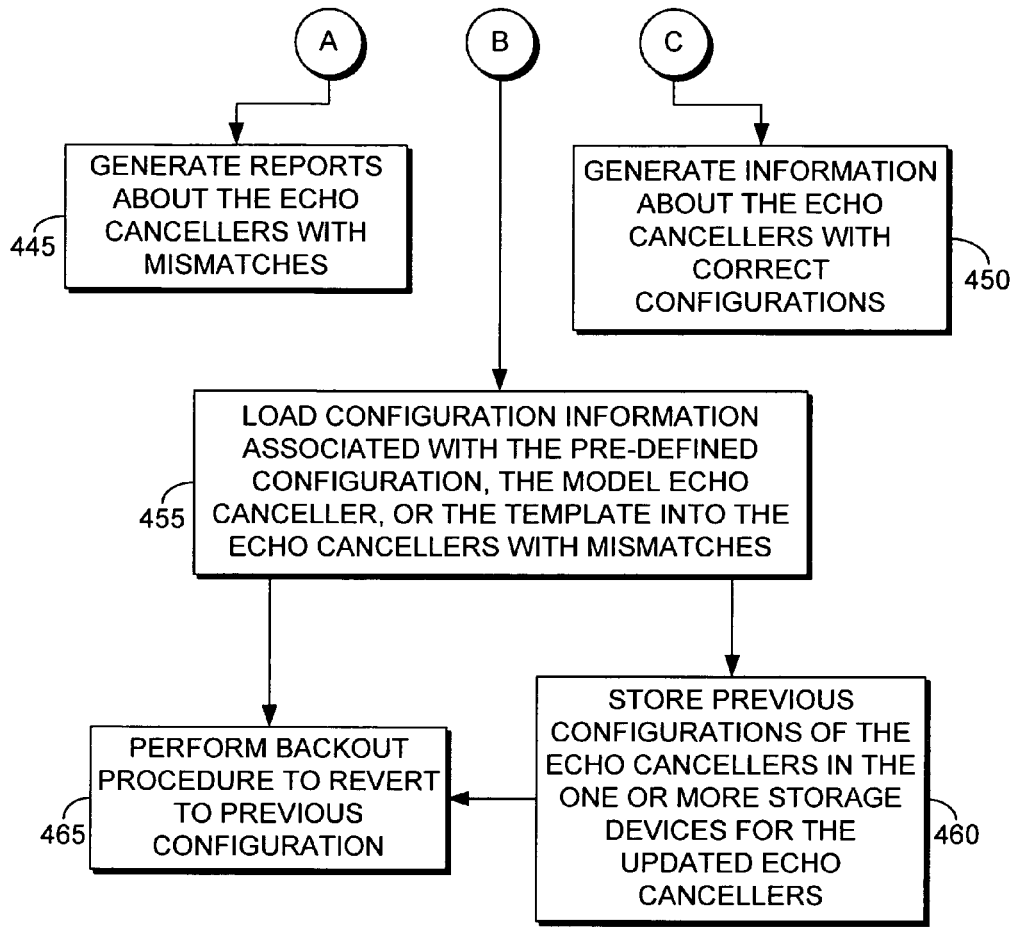

In FIG. 4, a process for automatically configuring a number of echo cancellers is shown in a method 400. In a step 405, a telecommunication switch is analyzed to determine transmission characteristics of the trunk circuits and trunk paths. This information is used to set the configurations of the echo cancellers that are to be connected to the trunk circuits for the switch. When the echo cancellers are initially installed and configured, they begin operation to stop echo as shown in a step 410.

In a step 415, a mask file may be created for those parameters that have special values that deviate from the majority of parameters in other echo cancellers. The mask file holds these parameters so that any further action taken on the echo cancellers may identify these special parameters. For example, thousands of echo cancellers may have the same parameter values. A few echo cancellers from this group may have some parameters with different values due to specific transmission characteristics. With numerous echo cancellers, it is important to know which echo cancellers have special parameters so that if a certain action is taken for the entire group, exceptions may be made for the special parameters or the echo cancellers with the special parameters.

In a step 420, configuration information for the echo cancellers are maintained in storage devices. The storage devices may include a database, data store, or memory. Furthermore, the storage devices may reside on or with the echo cancellers, or the storage devices may reside in a separate set of computing devices.

An implementation of an embodiment of the present invention allows a pre-defined configuration, a model echo canceller, or a template to be maintained as a preferred configuration data for the echo cancellers as shown in a step 425. Depending on the characteristics of the echo cancellers, the pre-defined configuration, model echo canceller, or template may exist for all the echo cancellers or may exist for groupings of echo cancellers. Certain echo cancellers may be associated with one set of pre-defined configuration, model echo canceller, or template and other echo cancellers may be associated with another set. Furthermore, either the pre-defined configuration, model echo canceller, or template may exist, but all three do not have to exist as preferred configuration data.

In a step 430, the configurations of the echo cancellers are compared to either the pre-defined configuration, the model echo canceller, or the template. The mask file is used to except or remove parameters from the comparison activity in a step 435. For the parameters that remain, mismatches in the parameters between the configurations of the echo cancellers and either the pre-defined configuration, the model echo canceller, or the template are determined in a step 440.

In steps 445 and 450, reports may be generated about the echo cancellers. Information may be created for the parameters with incorrect values resulting in mismatches with the ideal or preferred configuration. A status of the correctly working echo cancellers may be reviewed.

In some cases, the configuration of an echo canceller may be updated to correct one or more parameters. The configuration information may be taken from the pre-defined configuration, the model echo canceller, or the template as shown in a step 455. The original configuration of the echo canceller may be stored in a storage device prior to the updating process so that a record is maintained or a backout is needed (step 460). However, if a problem occurs, a backout procedure may be performed to revert the echo canceller back to the original configuration as shown in a step 465. A backout procedure may be a set of instructions that are performed on the echo canceller to reverse the updating process. In the backout procedure, the echo canceller is taken back to an existing condition prior to the update.

In method 400, a software tool may perform many of the steps that are identified. The tool may execute to perform the steps on thousands of echo cancellers in a switching office as well as on echo cancellers in other switching offices. As shown in FIG. 3, the tool has access to the echo cancellers through network connections.

Turning now to FIG. 3, an exemplary operating environment suitable for practicing an embodiment of the present invention is shown in 300. Environment 300 illustrates a public switch telephone network (PSTN) 330 connected to a packet network 345. PSTN 330 includes telecommunications equipment and services for handling voice and data calls. FIG. 3 illustrates PSTN 330 with a switch 310 connected to a set of echo cancellers (EC) 305 (305A, 305B, and 305N). As the number of echo cancellers may vary, EC 305 represents a flexible number of echo cancellers that may be connected to switch 310. EC 305 may connect across PSTN 330 through truck circuits 315 to another set of echo cancellers at EC 320 (320A, 320B, and 320N). EC 320 connects to another switch 325. The number of echo cancellers with EC 320 may vary depending on the connections to switch 325. Switch 310 and EC 305 may be located in a switching office or in proximity to each other while switch 325 and EC 320 may be located in another switching office or in proximity to each other as well.

As discussed above, a user may use telephone 350 to call another user at telephone 355. An exemplary talking path is created through switch 310, a member of EC 305, a member of trunk circuits 315, a member of EC 320, switch 325, to telephone 355. The echo cancellers are configured to remove echo as discussed above. Another implementation of an embodiment of the present invention may illustrate FIG. 3 without EC 320. It is possible to operate an embodiment of the present invention with EC 305 and without EC 320, or vice versa.

A network operator or other personnel may implement an embodiment of the present invention by using a server 335, a computer 340, packet network 345 and PSTN 330. Server 335 may have network connections to EC 305 and EC 320 through packet network 345 or through PSTN 330. Network connections to EC 305 and EC 320 may be implemented using ethernet connections that go through packet network 345 or using port connections that go through PSTN 330. Computer 340 has flexible access to EC 305 and EC 320 using the various network connections.

With computer 340 and server 335, a software tool (not shown) may be executed to perform a set of functions to interact with EC 305 and EC 320. The software tool may access configuration data of EC 305 and EC 320 as well as verify and update information associated with EC 305 and EC 320. Also, although one illustration of computer 340 and server 335 are shown, another embodiment of the present invention may show several computer 340s or several server 335s with the software tool operating on all or some of them.

The ability of the software tool to interact with EC 305 and EC 320 may be accomplished using command line inputs, a web interface, or other communication techniques. The software tool may operate automatically to keep EC 305 and EC 320 operating with the correct configurations. Furthermore, with the possibility of maintaining thousands of echo cancellers, the automation activity may enable the network operator or other personnel to reduce the amount of labor dedicated to maintaining echo cancellers and to respond to problems faster associated with echo in a voice communication.

For example, in a possible scenario implementing an embodiment of the present invention, a web interface may exist at computer 340. The web interface may be provided by server 335. A web application may provide a user with an option to configure members of EC 305 or EC 320 with a pre-defined configuration, a model echo canceller, or a template. This action may be accomplished manually or automatically. The user may also have an option to restore an echo canceller's previous configuration (like a pre-defined configuration) from a storage device as discussed above. The user may verify a current configuration, compare configurations to an ideal configuration, and generate information in the form of reports or statistics. Various embodiments may be implemented to allow the user or network operator to operate the software tool to interact with EC 305 or EC 320 in different manners.

In FIGS. 5A, 5B, and 5C, collectively known as FIG. 5, an exemplary comparison report is shown in 500. FIG. 5 illustrates an exemplary output of a comparison between a echo canceller identified by 505 and a preferred configuration data identified by 510. As shown in FIG. 5, several mismatches are shown with a comparison of 505 and 510. For example, at 515, the LOF Alarm Send for echo canceller 505 is set to "Major" while the preferred setting at 510 is set to "Warning". If one or more of these parameters are not placed in the mask file for exception, echo canceller 505 may be a candidate for an update to bring the parameters in line with the parameters in 510. The parameters in 510 may originate from a pre-defined configuration, a model echo canceller, or a template as discussed above.

Figure 6A:
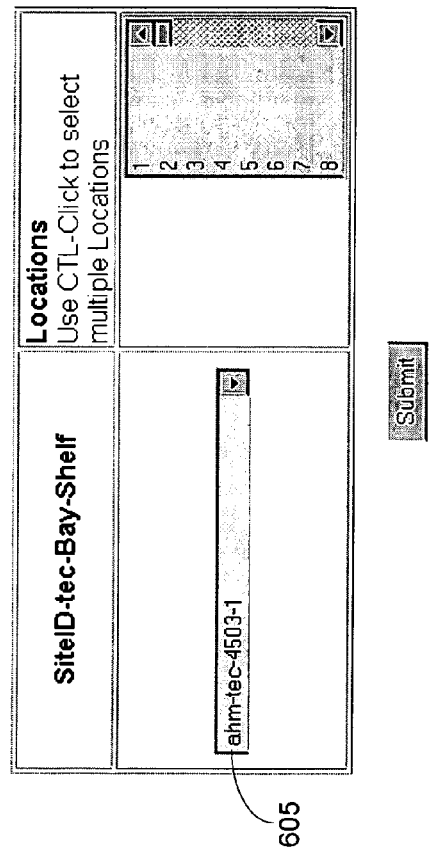

In FIGS. 6A and 6B, an exemplary echo canceller report is shown in 600. Report 600 shows an output of data for echo canceller 605. As shown in FIGS. 6A and 6B, a user may select an echo canceller and several locations to obtain the exemplary output. FIGS. 6A and 6B illustrate the possible outputs that may be achieved in implementing an embodiment of the present invention.

In FIGS. 7A and 7B, an exemplary set of algorithms are shown in 700 to illustrate some of the actions that may be performed with the software tool. The set of algorithms 700 are by no means the only way to practice the present invention but are illustrative in describing the possible detailed functions that may be accomplished.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A computer system having a processor and a memory, the computer system operable to execute a method for verifying configuration information in an echo canceller, comprising:

retrieving a first set of configuration parameters from a database of the echo canceller, wherein the first set of configuration parameters are based on an operating environment of the echo canceller, and wherein the echo canceller is configured with the first set of configuration parameters prior to operation;

comparing the first set of configuration parameters to at least a second set of configuration parameters from one of a pre-defined configuration, another echo canceller, or a template;

identifying one or more mismatches between the first set of configuration parameters and at least the second set of configuration parameters from one of the pre-defined configuration, the another echo canceller, or the template; and updating the echo canceller with the second set of configuration parameters from one of the pre-defined configuration, the another echo canceller, or the template when the one or more mismatches are identified, wherein the pre-defined configuration comprises a last known correct configuration, wherein the another echo canceller is a model echo canceller that provides a set of configuration parameters to the echo canceller, and wherein the template is a set of specifically-created configuration parameters that are tailored for the echo canceller.

2. The system of claim 1 further comprising receiving a mask file to identify a subset of the first set of configuration parameters to remove from the comparison.

3. The system of claim 1 further comprising storing one or more configurations respectively for one or more additional echo cancellers in one or more storage devices.

4. The system of claim 3 wherein the one or more storage devices are selected from a group including a database, a data store, and a memory.

5. One or more non-transitory computer-readable media having instructions stored thereon for performing the system of claim 1.

6. A computer system having a processor and a memory, the computer system operable to execute a method for setting a configuration of an echo canceller, comprising:

retrieving a first set of configuration parameters from a database of the echo canceller, wherein the first set of configuration parameters are based on an operating environment of the echo canceller, further wherein the echo canceller is located near a switching equipment and interfaces with the switching equipment; and wherein the echo canceller is configured with the first set of configuration parameters prior to operation;

comparing the first set of configuration parameters to at least a second set of configuration parameters from one of a pre-defined configuration, another echo canceller, or a template; and updating the echo canceller with the second set of configuration parameters when the first set of configuration parameters mismatches at least the second set of configuration parameters from one of the pre-defined configuration, the another echo canceller, or the template, wherein updating the echo canceller comprises loading the echo canceller with at least the second set of configuration parameters from one of the predefined configuration, the another echo canceller, or the template.

7. The system of claim 6 further comprising storing one or more pre-update configurations respectively for one or more additional echo cancellers in one or more storage devices.

8. The system of claim 7 wherein storing the one or more pre-update configurations respectively of the one or more additional echo cancellers in the one or more storage devices comprises storing the one or more pre-update configurations respectively of the one or more additional echo cancellers in at least one of one or more first databases of the one or more additional echo cancellers, or one or more second databases of one or more computing devices.

9. The system of claim 8 further comprising loading the one or more pre-update configurations respectively into the one or more additional echo cancellers during at least one of a performance of a backout procedure or an occurrence of an error condition.

10. The system of claim 6 further comprising storing one or more updated configurations of the updated echo canceller in one or more storage devices.

11. The system of claim 10 wherein storing the one or more updated configurations of the echo canceller in the one or more storage devices comprises storing the one or more updated configurations of the echo canceller in at least one of a database of the echo canceller, or one or more databases of one or more computing devices.

12. The system of claim 6 further comprising receiving a mask file to identify a subset of the first set of configuration parameters to remove from the comparison.

13. One or more non-transitory computer-readable media having instructions stored thereon for performing the method on the computer system of claim 6.

14. A system for managing a number of echo cancellers, comprising:
 a plurality of echo cancellers operable in a first network;
 the plurality of echo cancellers operable to communicate with one or more computing devices through the first network or a second network;
 the one or more computing devices operable with a tool to exchange a set of data between the tool and the plurality of echo cancellers, wherein the tool performs steps on the plurality of echo cancellers; and
 the tool operable to retrieve a first set of configuration parameters from the plurality of echo cancellers, receive a mask file to identify a subset of the first set of configuration parameters to remove from a comparison between the first set of configuration parameters and a second set of configuration parameters corresponding to one of a pre-defined configuration, another echo canceller or a template, and to perform the comparison using the mask file to except parameters from the comparison.

15. The system of claim 14 further comprising the tool operable to update the plurality of echo cancellers when the first set of configuration parameters mismatches the second set of configuration parameters.

16. The system of claim 14 further comprising the tool operable to report one or more mismatches between the first set of configuration parameters and the second set of configuration parameters.

17. The system of claim 15 further comprising the tool operable to store one or more pre-update configurations respectively of the plurality of echo cancellers in one or more storage devices.

18. The system of claim 17 wherein the tool stores the one or more pre-update configurations respectively of the plurality of echo cancellers in at least one of one or more first databases of the plurality of echo cancellers, or one or more second databases of the one or more computing devices.

19. The system of claim 18 further comprising the tool operable to load the one or more pre-update configurations respectively into the plurality of echo cancellers during at least one of a performance of a backout procedure or an occurrence of an error condition.

20. The system of claim 15 further comprising the tool operable to store one or more updated configurations respectively of the updated plurality of echo cancellers in one or more storage devices.

21. The system of claim 20 wherein the tool stores the one or more updated configurations respectively of the plurality of echo cancellers in at least one of one or more first databases of the plurality of echo cancellers, or one or more second databases of the one or more computing devices.

22. The system of claim 14 wherein the first network is a public switched telephone network (PSTN) and the second network is a packet network.

\* \* \* \* \*